(12) United States Patent
Yamamoto et al.

(10) Patent No.: US 6,577,569 B1
(45) Date of Patent: Jun. 10, 2003

(54) OPTICAL DISK REROUCING DEVICE

(75) Inventors: Yoshihiro Yamamoto, Kyoto (JP);
Hiroshi Oyabu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/544,813

(22) Filed: Apr. 7, 2000

(30) Foreign Application Priority Data

Apr. 9, 1999 (JP) .......................... 11-102871

(51) Int. Cl.[7] .......................... G11B 20/24; G11B 20/18
(52) U.S. Cl. .......................... 369/47.18; 369/47.32; 369/47.34; 369/53.32
(58) Field of Search .......................... 369/47.18, 47.32, 369/47.34, 53.32, 53.34

(56) References Cited

U.S. PATENT DOCUMENTS

| 4,663,752 A | * | 5/1987 | Kakuse et al. | ........... 369/47.18 |
|---|---|---|---|---|
| 4,669,075 A | * | 5/1987 | Abe | ........... 369/47.18 |
| 5,226,026 A | * | 7/1993 | Oshiba | ........... 369/47.18 |
| 5,446,715 A | * | 8/1995 | Satomura | ........... 369/47.18 |
| 6,041,029 A | * | 3/2000 | Iida et al. | ........... 369/47.18 |

* cited by examiner

*Primary Examiner*—Richemond Dorvil
(74) *Attorney, Agent, or Firm*—Mattingly, Stanger & Malur

(57) ABSTRACT

An optical disk reproducing device, comprises a judgement circuit which, under an operating condition in which demodulated data amounting for one frame are being stored in a memory in synchronism with internally supplemented synchronous signals, and when an external first synchronous signal is detected from read-out signals, judges whether the external first synchronous signal appears in the first half or in the second half in the period of the internally supplemented synchronous signal, and when the judgement circuit judges that the external first synchronous signal appeared in the first half of the period of the internally supplemented synchronous signal, the demodulated data amounting for one frame are stored in the memory at a memory position for the immediately previous frame.

8 Claims, 4 Drawing Sheets

US 6,577,569 B1

1

OPTICAL DISK REROUDUCING DEVICE

BACKGROUND OF THE INVENTION

1. Field of the Invention

The present invention relates an optical disk reproducing device and more specifically to an optical disk reproducing device, in particular a CD (Compact Disk) reproducing device, which suppresses discontinuity of demodulated frame data to be stored in an internal memory of the device which will be caused when resynchronizing from a synchronous state by internal synchronous signals in case of missing of external synchronous signals due to such as a flaw of a CD to external synchronous signals read out from the CD thereafter.

2. Background Art

In connection with a CD reproducing device which is one of optical disk reproducing devices, synchronous signals sometimes can not be detected because of a flaw on the CD. Usually, inside a CD reproducing device a synchronous protection circuit is incorporated which generates synchronous signals internally, thus, when external synchronous signals can not be detected, the synchronous signals generated internally can supplement the external synchronous signals.

FIG. 4 is an example of such CD reproducing devices.

In FIG. 4, numeral 20 is the CD reproducing device on which a CD 1 is mounted and which is constituted by such as a rotary drive mechanism for rotating the CD 1 mounted thereon, a pick-up (a tetra-section photo detector) 3, an RF amplifier 4 which amplifies received optical signals from the pick-up 3 and produces RF detection signals (total received optical amount detection signals) as read-out signals, an EFM (Eight to Fourteen Modulation) demodulation circuit 5 which receives the read-out signals from the RF amplifier 4, a synchronous signal detection circuit 6 which also receives the read-out signals from the RF amplifier 4, further, an internally inserting supplement use synchronous signal generating circuit 7, a synchronous signal selection circuit 8, an address generation and writing circuit 9, an SRAM 10, an ECC error correction circuit 11, a data read-out and output circuit 12, a clock generation circuit 13 for read-out system and a clock generation circuit 14 for reproducing system.

Herein, the EFM demodulation circuit 5 receives the read-out signals (RF detection signals) and demodulates EFM data. The synchronous signal detection circuit 6 receives the read-out signals, extracts synchronous signals from the received read-out signals to detects external synchronous signals therein and outputs the detected external synchronous signals as synchronous signals DSYNC. The internally inserting supplement use synchronous signal generating circuit 7 includes a 588-adic counter therein, counts clocks CLK from the clock generation circuit 13 and generates internal synchronous signals ISYNC in synchronism with the synchronous signals DSYNC by resetting the count value when the synchronous signals DSYNC are received.

The synchronous signal selection circuit 8 receives the synchronous signals DSYNC and the synchronous signals ISYNC and selects either of them, in that when the synchronous signals DSYNC are received from the synchronous signal detection circuit 6, the synchronous signal selection circuit 8 outputs the synchronous signals DSYNC as synchronous signals RSYNC and when no synchronous signals DSYNC are received, outputs the synchronous signal ISYNC as synchronous signals RSYNC. Thereby, when the synchronous signals DSYNC are missing, the synchronous signals ISYNC are supplemented by the synchronous signal selection circuit 8.

The clock generation circuit 13 receives the read-out signals from the RF amplifier 4, generates clocks CLK (588 clocks) through a PLL control and sends out the clocks CLK to the respective circuits in FIG. 4 other than such as the SRAM 10, the ECC error correction circuit 11, and the data read-out and output circuit 12 belonging to the reproducing system. The SRAM 10, the ECC error correction circuit 11 and the data read-out and output circuit 12 receive clocks CK from clock generation circuit 14 for generating clocks for the reproducing system and are operated thereby.

The address generation and writing circuit 9 receives the synchronous signals RSYNC to renew addresses in the SRAM 10, writes the EFM data corresponding to one frame amount (amount of 588 channels) which are demodulated by the EFM demodulation circuit 5 the renewed addresses in the SRAM 10 and stores the EFM data in the SRAM 10. The ECC error correction circuit 11 reads out a predetermined amount of the stored data from the SRAM 10 with reference to the presently recorded data position, performs ECC error correction with regard to newly stored data of one frame amount and returns the corrected data to the SRAM 10. The data read-out and output circuit 12 reads out the ECC error corrected data and outputs the same to the side of an analogue reproducing circuit which reproduces the same after performing digital analogue conversion.

Further, the RF amplifier 3 includes inside thereof a focus position error generation circuit which generates RF detection signals (total received optical amount detection signals) and position error detection signals FE with respect to a focus position of laser beams irradiated on an optical disk, and the RF detection signals and the position error detection signals FE are provided to a focus servo mechanism performing a focusing servo, however, of which illustration is omitted.

FIGS. 5(a) through 5(e) are explanatory diagrams on the synchronous signal generation by the synchronous signal selection circuit 8 and on the storing timing of one frame data in the SRAM 10.

When there exist synchronous signals DSYNC as shown in FIG. 5(a), the synchronous signal selection circuit 8 generates synchronous signals RSYNC in correspondence with synchronous signals DSYNC as shown in FIG. 5(c), and when no synchronous signals DSYNC exist, synchronous signals RSYNC in correspondence with the synchronous signals ISYNC as shown in FIG. 5(b) are generated.

Thereby, the CD reproducing device is supplemented in synchronism with the synchronous signals ISYNC, however, since the synchronous signals ISYNC are generated by counting the internal clocks CLK, for example, if after completing a writing process for 5th frame in the SRAM 10, a synchronous signal DSYNC is generated as a resynchronized synchronous signal as shown in FIG. 5(c) through FIG. 5(e), the EFM data are stored in the SRAM 10 while assuming the subsequent frame as a frame 6. This occurs because the generation timing of the synchronous signal ISYNC advances, in that is shifted forward with respect to the synchronous signal DSYNC of the resynchronized synchronous signal. In such instance, with regard to the EFM data for the 5th frame, a part of the EFM data are stored in the 5th frame or a part of the EFM data for the 4th frame are stored in the 5th frame as shown in FIG. 5(e), and the data to be primarily stored in the SRAM 10 for the 5th frame are moved to a position for the 6th frame. As a result, a problem arises that the EFM data from the 4th frame to the 6th frame are discontinuously stored in the memory.

Further, FIG. 5(d) shows count values of clocks CLK in the respective frames and usually 588 clocks are contained in one frame. Further, the numerals in FIG. 5(e), for explanation convenience, by ordinal numbers successively from the first frame, represent address positions in the SRAM 10 which are successively selected in accordance with the frame order as logical addresses for every one frame, and are simply used for explanation convenience, of which understanding is also true in the following explanation.

SUMMARY OF THE INVENTION

An object of the present invention is to resolve the above conventional art problems and to provide an optical disk reproducing device, in particular a CD (Compact Disk) reproducing device, which suppresses discontinuity of demodulated frame data to be stored in an internal memory of the device which will be caused when resynchronizing from a synchronous state by internal synchronous signals in case of missing of external synchronous signals due to such as a flaw of an optical disk to external synchronous signals read-out from the optical disk thereafter.

An optical disk reproducing device which achieves the above object and in which first synchronous signals are detected from read-out signals from an optical disk by a synchronous signal detection circuit, data amounting for one frame are demodulated from the read-out signals by a demodulation circuit, the demodulated data amounting for one frame are successively stored in a memory in synchronism with the first synchronous signals, when no first synchronous signals are detected, the demodulated data amounting for one frame are successively stored in the memory in synchronism with second synchronous signals generated in the device and thereafter when the first synchronous signals are detected from the read-out signals, data amounting for one frame are successively stored in the memory in synchronism with the first synchronous signals, is characterized in that the optical disk reproducing device comprises a judgement circuit which, under an operating condition in which the demodulated data amounting for one frame are being stored in the memory in synchronism with the second synchronous signals, and when a first synchronous signal is detected from the read-out signals, judges whether the first synchronous signal appears in the first half or in the second half in the period of the second synchronous signal, and when the judgement circuit judges that the first synchronous signal appeared in the first half of the period of the second synchronous signal, the demodulated data amounting for one frame are stored in the memory at a memory position for the immediately previous frame.

As has been explained above, through the provision of the judgement circuit which judges whether the first synchronous signal (external synchronous signal) detected when resynchronized appears in the first half period of the second synchronous signal (internal synchronous signal), when it is judged that the first synchronous signal appeared in the first half, which implies that the second synchronous signal representing an internal synchronous signal advances with respect to the first synchronous signal, therefore, the demodulated data amounting one frame are stored in the memory at the memory position for the immediately prior frame. Thereby, the demodulated data amounting one frame are stored in the memory at a correct position.

Contrary, when the first synchronous signal is generated in the second half of the period of the second synchronous signal, which implies that the second synchronous signal representing an internal synchronous signal delays with respect to the first synchronous signal, the resynchronized first synchronous signal can be treated as the subsequent synchronous signal, therefore, it is sufficient if the data are stored as usual in the memory at the memory position for the subsequent frame accordingly. Thereby, at the time of resynchronization the demodulated data amounting one frame are stored in the memory at a correct position.

As a result, since the demodulated data amounting one frame are successively stored in the memory at respective correct positions, a possible discontinuity of reproduced data is avoided. Further, in the latter case where the second synchronous signal representing an internal synchronous signal delays with respect to the first synchronous signal, a part of the demodulated data amounting one frame may not be stored in the previous frame. Such condition scarcely causes problem during reproduction because of the provision of the ECC error correction circuit, however, when such condition occurs, it is sufficient if the writing speed in a memory operating in the reproduction system and the processing speed of the ECC error correction circuit are increased. Such requirement can be achieved, for example, by operating the ECC error correction circuit with fast clocks in the read-out system.

DETAILED DESCRIPTION OF THE PREFERRED EMBODIMENT

Figure 1:
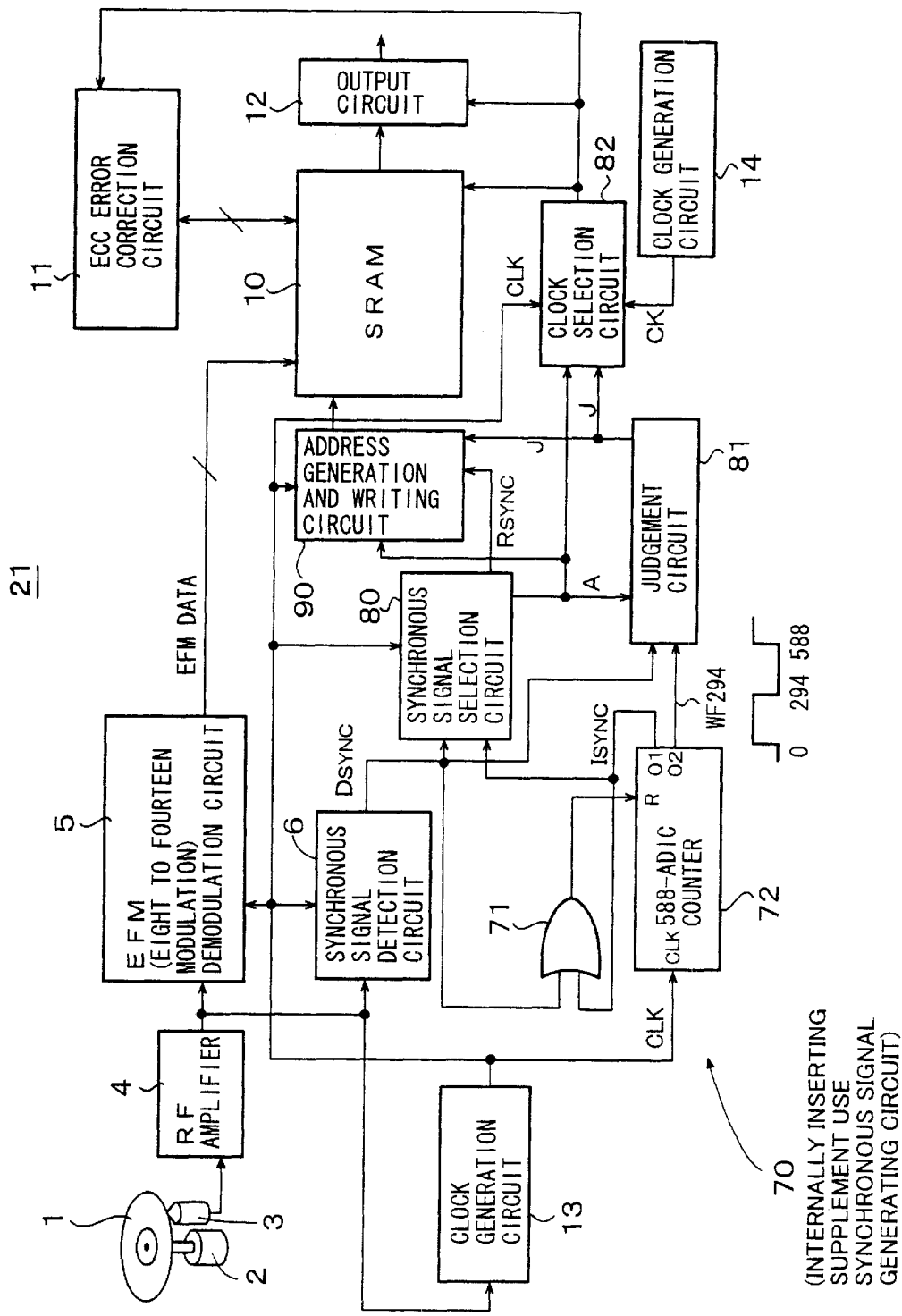
FIG. 1 is a block diagram of a CD reproducing device to which an optical disk reproducing device according to the present invention is applied.
Figure 4:
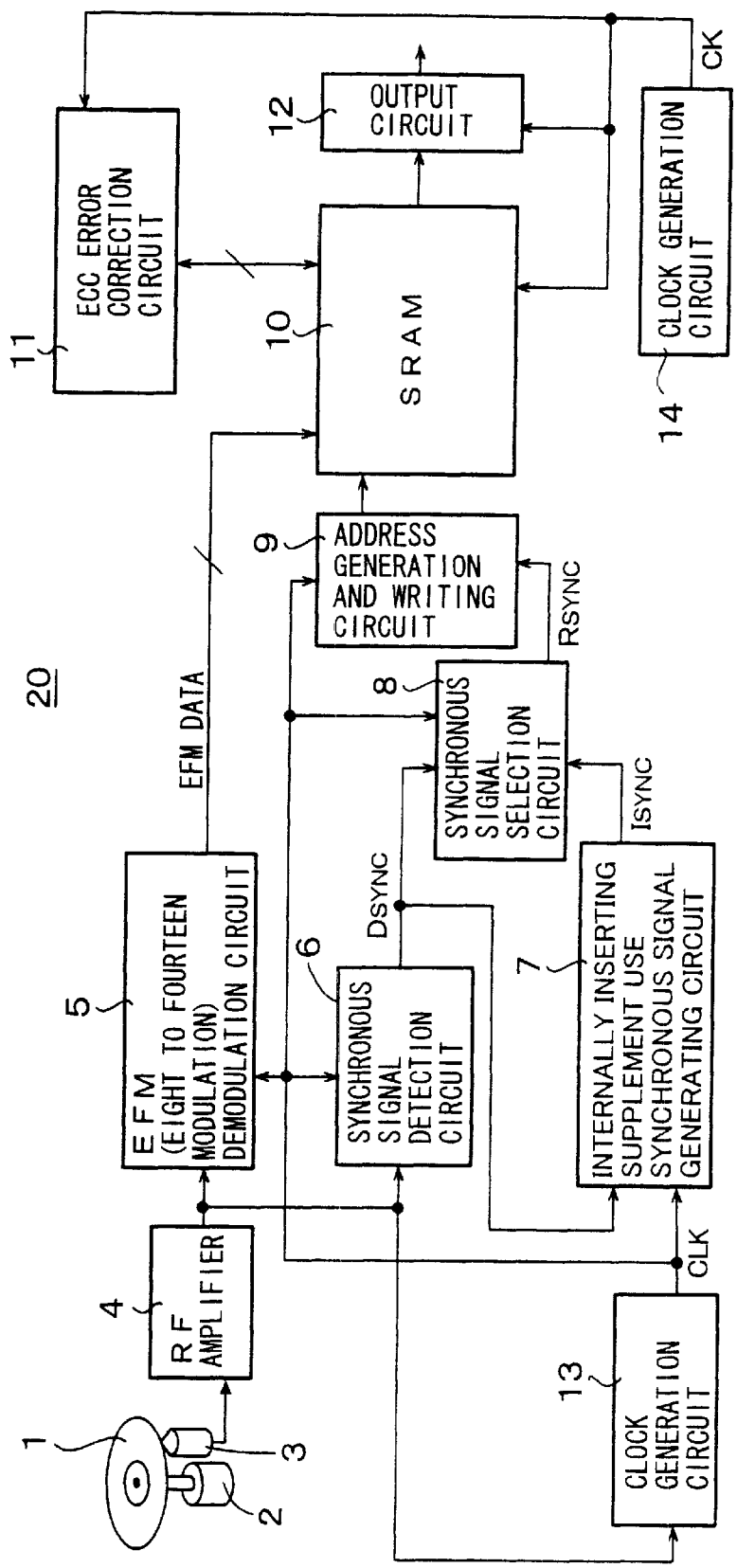
FIG. 4 is a block diagram of an internal structure of a generally known CD reproducing device.
Figure 5:
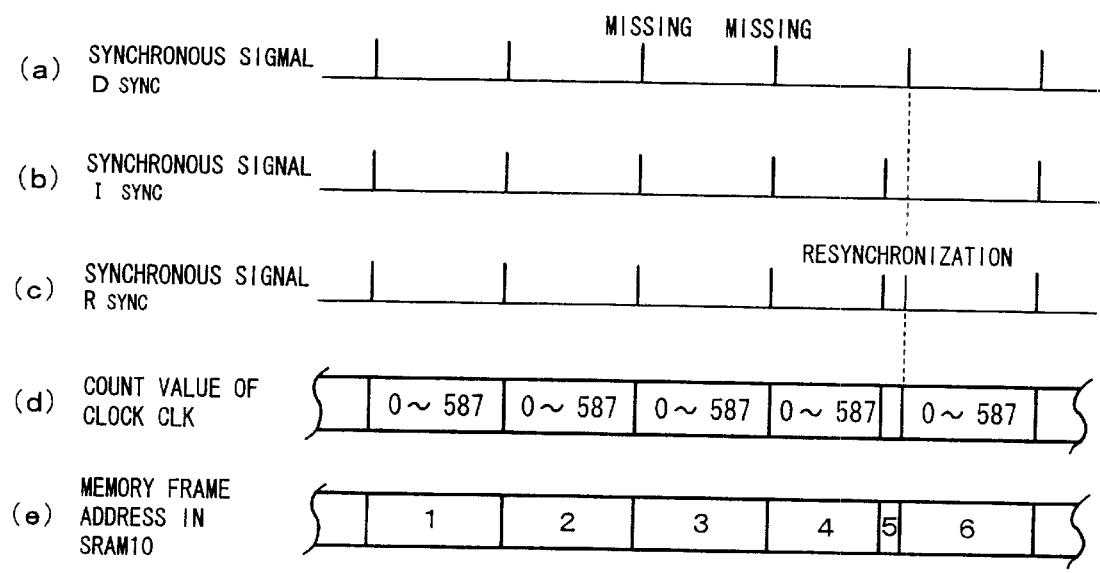
FIG. 5(a) through 5(e) are explanatory diagrams on synchronous signal generation by a synchronous signal selection circuit and storage timing of data amounting one frame in a SRAM.

In FIG. 1, the same or equivalent constituting elements as in FIG. 4 are designated by the same reference numerals as in FIG. 4, and the explanation thereof is omitted.

In FIG. 1, numeral 21 is a CD reproducing device in which, in place of the internally inserting supplement use synchronous signal generating circuit 7 in FIG. 4, an internally inserting supplement use synchronous signal generating circuit 70 is provided, in place of the synchronous signal selection circuit 8 a synchronous signal selection circuit 80, a judgement circuit 81 and a clock selection circuit 82 are provided, and further, in place of the address generation and writing circuit 9 an address generation and writing circuit 90 is provided.

The internally inserting supplement use synchronous signal generating circuit 70 is constituted by an OR gate 71 and a 588-adic counter 72 which receives clocks CLK from the clock generating circuit 13 and counts the clocks CLK. The OR gate 71 receives synchronous signals DSYNC from the synchronous signal detection circuit 6 as well as receives from an output terminal 01 of the 588-adic counter 72 a completion signal indicating completion of 588 counts corresponding to count value amounting one frame. Thus, the 588-adic counter 72 is reset depending on an input from either of them. Further, the 588-adic counter 72 generates at an output terminal 02 an output WF 294 corresponding to a 294 count value half of 588 counts. Still further, the output WF 294 is a signal which shows a HIGH level (hereinbelow, indicate as "H") during count 0 to count 294.

The synchronous signal selection circuit 80 receives the synchronous signals DSYNC from the synchronous signal detection circuit 6 and, when the synchronous signals exist, outputs the synchronous signals as the synchronous signals RSYNC. Further, no synchronous signals DSYNC are received, the synchronous signal selection circuit 80 selects the synchronous signals ISYNC and outputs the same as the synchronous signals RSYNC. Still further, at the time when the selection of the synchronous signal selection circuit 80 has been changed over to the side of the synchronous signals ISYNC, activation signals A are sent out to the frame number judgement circuit 81. The frame number judgement circuit 81 is activated upon receipt of the activation signals A, and when the output WF 294 representing the 294 count value from the 588-adic counter 72 and the resynchronized synchronous signals DSYNC from the synchronous signal detection circuit 6 are received, the frame number judgement circuit 81 judges whether the resynchronized synchronous signals DSYNC is generated in the first half of the one frame period of the synchronous signal ISYNC. If it is judged that the resynchronized synchronous signal is generated in the first half, a judgement result signal J is sent out to the address generation and writing circuit 90.

When a resynchronized synchronous signal DSYNC is detected by the synchronous signal detection circuit 6, upon receipt of the detection signal the synchronous signal selection circuit 80 is changed over to the side of the resynchronized synchronous signal DSYNC, and after selecting the synchronous signal DSYNC, stops the activation signals A for the frame number judgement circuit 81. Thereby, the operation of the frame number judgement circuit 81 is stopped. Further, the operation stop of frame number judgement circuit 81 is adjusted at a timing after the generation of the judgement result signal J.

Further, the operation timings and the adjustment of the respective output signals of the respective circuits such as the synchronous signal detection circuit 6, the synchronous signal selection circuit 80, the frame number judgement circuit 81 and the EFM demodulation circuit 5 are performed by inserting such as a delay circuit, however, since such is merely a design matter, the explanation thereof is omitted here.

The address generation and writing circuit 90 receives the synchronous signals RSYNC and in response to the synchronous signals RSYNC successively renews the address of the SRAM 10 by the amount of demodulated one frame data to be stored (amount of one frame data), receives the clocks CLK from the clock generation circuit 13 and further, receives the judgement result signal J from the frame number judgement circuit 81. When the judgement result signal J is received, the address generation and writing circuit 90 stores in response to the synchronous signal DSYNC the data amounting one frame in the SRAM 10 without renewing the address value of the SRAM 10. Thereby, the EFM data when the operating condition moves into a resynchronization are stored by overwriting on the immediately prior frame position and are stored in the SRAM 10 with a correct frame number.

Figure 2:
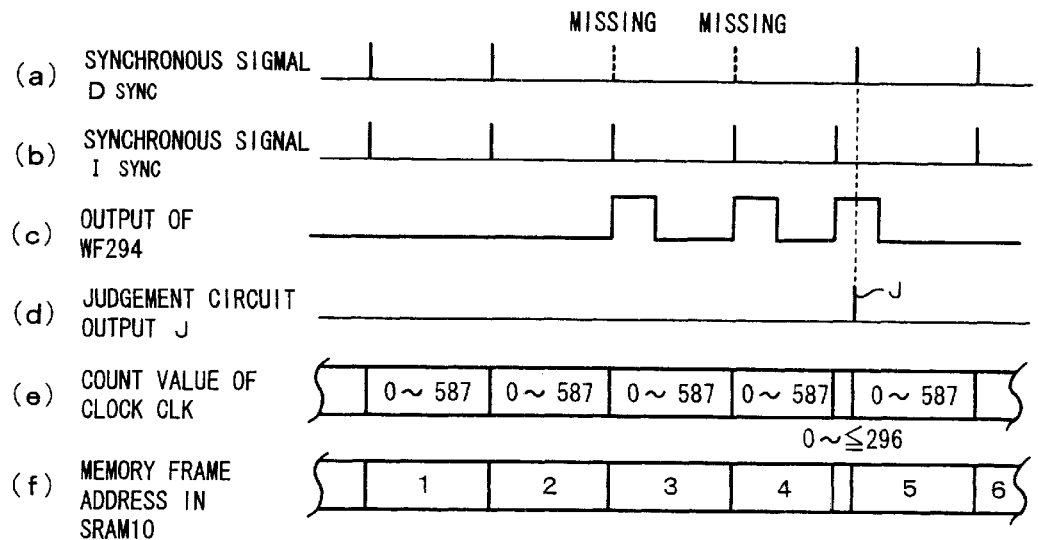
FIG. 2(a) through 2(f) are explanatory diagrams on the relationship between resynchronization timing and frame memory, when an external synchronous signal delays with respect to an internal synchronous signal.

Such condition will be explained with reference to FIG. 2(a) through 2(f). As has been explained in connection with FIGS. 5(a) through 5(e), when there exist the synchronous signals DSYNC as shown in FIG. 2(a), the synchronous signal selection circuit 80 generates the synchronous signals RSYNC in response to the synchronous signals DSYNC, and when no synchronous signals DSYNC exist, the synchronous signals RSYNC in response to the synchronous signals ISYNC as shown in FIG. 2(b) are generated. When the synchronization is supplemented by the synchronous signals represented by the synchronous signals ISYNC, the output WF 294 representing the 294 count value appearing at the output terminal 02 of the 588-adic counter 72 becomes effective ("H"). Thus, if the output WF 294 is "H" when a resynchronized synchronous signal DSYNC is generated, the frame number judgement circuit 81 outputs the judgement result output J as shown in FIG. 2(d).

Thereby, the address generation and writing circuit 90 performs a processing of storing the data amounting one frame at the address of frame number 5 in the SRAM 10 corresponding to the frame number 5 without renewing the address of the prior frame number (the numerical value is shown as a logic address corresponding to the frame number) as shown in FIG. 2(f). Further, FIG. 2(e) shows count values of clocks CLK in the respective frames of the 588-adic counter 72.

As a result, the data for the 5th frame are stored at the primary position in the SRAM 10 and the data from the frame 4 to the frame 6 are stored substantially continuously.

Further, in case when the generation timing of the resynchronized synchronous signal DSYNC is at the time of LOW level (hereinbelow as "L") of the output WF 294, the frame number judgement circuit 81 does not output a judgement result output J. In this instance, the address generation and writing circuit 90 performs the ordinary operation, and since the resynchronized synchronous signal DSYNC is for the subsequent frame, the address (the subsequent address corresponding to one frame) in the SRAM 10 is renewed in response to the synchronous signal DSYNC, and the EFM data to be stored are stored at a correct position without change.

Namely, when the resynchronized synchronous signal DSYNC is generated in the second half (when the output WF 294 is "L") of the period of the synchronous signal ISYNC, the resynchronized synchronous signal DSYNC is generated prior to the generation of the synchronous signal ISYNC, in that the internal synchronous signal ISYNC delays with respect to the resynchronized synchronous signal DSYNC, therefore, the resynchronized synchronous signal DSYNC is assumed as the subsequent synchronous signal, thus in response thereto the one frame data are stored at the subsequent address (address corresponding to one frame) in the SRAM 10 as usual. Thereby, at the time of resynchronization, the demodulated data amounting one frame are stored at a correct position in the SRAM 10.

As has been explained above, through the judgement by the frame number judgement circuit 81 whether or not the synchronous signal DSYNC generated at the time of resynchronization appears in the first half of the period of the internal synchronous signal ISYNC, when it is judged that the synchronous signal DSYNC is generated in the first half of the period which implies that the internal synchronous signal ISYNC advances with respect to the synchronous signal DSYNC, the renewal of the value (address corresponding to one frame) of the address generation and writing circuit 90 is suppressed, even if a synchronous signal DSYNC is generated and the data are stored in the SRAM 10 while setting the memory address in the SRAM 10 at a immediately prior one frame memory position. Thereby, the EFM demodulated data amounting one frame are successively stored at correct positions in the SRAM 10.

As a result, the EFM demodulated data amounting one frame are successively stored at correct positions in the SRAM 10, thereby, a possible discontinuity of the reproduced data is avoided.

Further, when the internal synchronous signal ISYNC is delayed with respect to the synchronous signal DSYNC, a part of the demodulated data mounting one frame may not be stored in the prior frame. However, because of the provision of the ECC error correction circuit 11, such scarcely causes problems for data reproduction, however, a countermeasure for such case when the internal synchronous signal ISYNC delays with respect to the synchronous signal DSYNC will be explained below. Further, in such instance, it is to be understood that the synchronous signal DSYNC advances with respect to the internal synchronous signal ISYNC because of rotation variation of the CD 1, therefore, the following explanation is made based on such understanding.

Now, the data read-out system for the CD is operated at 4.3218 MHz with 588 clocks, and the clock for the reproducing system is usually at 4.2336 MHz because of the sampling frequency of 44.1 kHz. Therefore, in the reproducing system the reproduction is performed with 576 clocks by the clock generation circuit 14. Between the read-out system and the reproducing system there is a spare corresponding to 12 clocks. During this spare time corresponding to 12 clocks, the processing is rested in the reproducing system.

Further, in order to eliminate influences of jitter the SRAM 10 is provided with a buffer region amounting ±4 frames for the demodulated data to be input and written. In the present embodiment, by making use of such difference between the read-out system and the reproducing system a countermeasure is taken for the case where the synchronous signals DSYNC advance with respect to the internal synchronous signals ISYNC, in other words the internal synchronous signals ISYNC delays with respect to the synchronous signals DSYNC.

The countermeasure is performed in such a manner that the clock selection circuit 82 selects the clocks CLK at the side of clocks 588 of the clock generation circuit 13.

The clock selection circuit 82 receives the activation signal A which is sent out from the synchronous signal selection circuit 80 to the frame number judgement circuit 81, the judgement result signal J of the frame number judgement circuit 81, further the clocks CLK (588 clocks) from the clock generation circuit 13 in the read-out system and the clocks (576 clocks) from the clock generation circuit 14, and outputs either clocks CLK or the clocks CK after selecting the same to the SRAM 10, the ECC error correction circuit 11 and the data read-out and output circuit 12.

Usually the clocks CK from the clock generation circuit 14 are selected as shown in FIG. 4 conventional art. When the activation signals A are received, but no judgement result signals J from the frame number judgement circuit 81 are received, namely when the synchronous signals DSYNC advances with respect to the internal synchronous signal ISYNC, the clocks CLK (588 clocks) from the clock generation circuit 13 in the read-out system are selected and sent out to the SRAM 10, the ECC error correction circuit 11 and the data read-out and output circuit 12.

Thereby, the reproducing system including the SRAM 10, the ECC error correction circuit 11 and the data read-out circuit 12 operates with clocks of 588 and performs faster processings as in usual.

In this instance, there is a spare time of 12 clocks for every one frame, therefore, if the read-out clocks vary about +20% as in usual, the phase of synchronous signals advances, and a delay caused thereby can be recovered after about 1.7 frames. Of course, at the time of the maximum variation of +50% a possible delay can be recovered by about 48 frames determined by 576/12=48. Therefore, if the selection interval of the clocks CLK by the clock selection circuit 82 is set equal to or more than 48 frames, a sufficient correction can be obtained. Accordingly, the clock selection circuit 82 restores its selection to the side of clocks CK after the interval corresponding to the 48 frames and outputs clocks CK for the usual operation of the reproducing system.

Now, with regard to the reproduction of a CD, the reproduction is usually performed with CLV (Constant Line Velocity), however, when reproduction is performed, for example, with a CAV (Constant Angular Velocity) mode in order to prevent sound skipping, the read-out clocks vary at about +20% and the variation thereof reaches up to ±50% at the maximum. Therefore, in such instance, the reproduction system is also required to be operated by making use of these read-out clocks. A CD reproducing device with such CAV mode is provided with a large buffer in order to prevent jitter as well as to prevent sound skipping. Therefore, as a countermeasure in case when the synchronous signals DSYNC advance with respect to the internal synchronous signals the clocks of 588 as well as the buffer can be used.

Namely, when the clock selection circuit 82 selects the clocks CLK at the side of the clock generation circuit 13 and outputs the same, the EFM data demodulated by the EFM demodulation circuit 5 amounting a predetermined time, for example, for 48 frames together with the synchronous signals are stored in the buffer (not shown) used for the CAV mode and are processed for reproduction. Thereafter, the processing returns to the clocks of 576 for the reproducing system to perform the usual processings.

Figure 3:
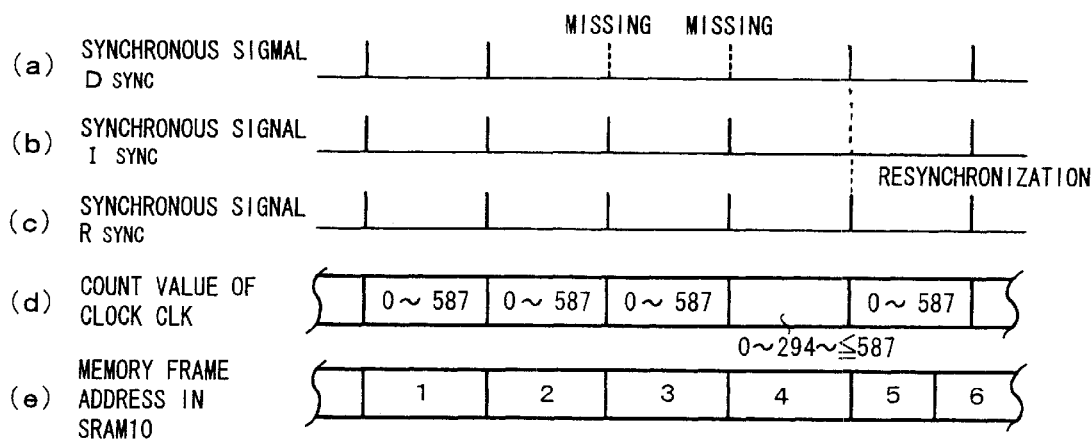
FIG. 3(a) through 3(e) explanatory diagrams on the relationship between resynchronization timing and frame memory, when an external synchronous signal advances with respect to an internal synchronous signal.

FIGS. 3(a) through 3(e) are explanatory diagrams in connection with a relationship between the resynchronization timing and the frame storage when the external synchronous signals DSYNC delay with respect to the internal synchronous signals ISYNC. FIGS. 3(a) through 3(e) correspond to FIGS. 5(a) through 5(e), in that FIG. 3(a) shows the synchronous signals DSYNC, FIG. 3(b) shows the synchronous signals ISYNC, FIG. 3(c) shows the synchronous signals RSYNC, FIG. 3(d) shows count values of the clocks CLK and FIG. 3(e) shows addresses (logic address) corresponding to memory frame numbers in the SRAM 10. In FIG. 3(e), it will be observed that the processing interval after the frame number 5 is shortened.

As has been explained hitherto, in the present embodiment, the frame number judgement circuit 81 judges whether the resynchronized synchronous signal DSYNC is generated in the first half of the one frame period of the internal synchronous signal ISYNC, however, the frame number judgement circuit 81 can be modified to judge whether the resynchronized synchronous signal DSYNC is generated in the second half thereof. In such modification, the operation in connection with the judgement result signal has to be reversed in that of the present embodiment, in that when the judgement result signal representing the generation of the resynchronized synchronous signal DSYNC in the second half is received, the address of the SRAM is renewed, and otherwise, the data amounting one frame are written in the SRAM at an immediately prior frame memory position without renewing the address.

Further, in the present embodiment, the SRAM is used as the memory which stores demodulated one frame data, however, such memory is not limited thereto and any general memories can be used therefor.

What is claimed is:

1. An optical disk reproducing device in which first synchronous signals are detected from read-out signals from an optical disk by a synchronous signal detection circuit, data amounting for one frame are demodulated from the read-out signals by a demodulation circuit, the demodulated data amounting for one frame are successively stored in a memory in synchronism with the first synchronous signals, when no first synchronous signals are detected, the demodulated data amounting for one frame are successively stored in the memory in synchronism with second synchronous signals generated in the device and thereafter when the first synchronous signals are detected from the read-out signals, data amounting for one frame are successively stored in the memory in synchronism with the first synchronous signals, characterized in that the optical disk reproducing device comprising a judgement circuit which, under an operating condition in which the demodulated data amounting for one frame are being stored in the memory in synchronism with the second synchronous signals, and when a first synchronous signal is detected from the read-out signals, judges whether the first synchronous signal appears in the first half or in the second half in the period of the second synchronous signal, and when the judgement circuit judges that the first synchronous signal appeared in the first half of the period of the second synchronous signal, the demodulated data amounting for one frame are stored in the memory at a memory position for the immediately previous frame.

2. An optical disk reproducing device according to claim 1, further comprising a pick-up which receives reflection beams from the optical disk; an amplifier which amplifies the received optical signals from the pick-up and generates the read-out signals; and a synchronous signal generating circuit which receives the first synchronous signals from the synchronous signal detection circuit and generates the second synchronous signals.

3. An optical disk reproducing device according to claim 2, further comprising an EFM demodulation circuit which receives the read-out signals from the amplifier and outputs the demodulated data; a synchronous signal selection circuit which receives the first synchronous signals from the synchronous signal detection circuit as well as receives the second synchronous signals from the synchronous signal generating circuit, and, when there exist the first synchronous signals, outputs the first synchronous signals and, when no first synchronous signals are received, outputs the second synchronous signals; and an address generation circuit which successively renews addresses in response to the output signals of the synchronous signals selection circuit and designates the memory position, wherein the pick-up includes a tetra-section photo detector which receives the reflection beams from the optical disk, the data amounting one frame are stored in the memory in accordance with the address designated by the address generation circuit, and when the judgement circuit judges that the first synchronous signal appears in the first half of the period of the second synchronous signals, the demodulated data amounting one frame are stored at a memory position of immediately prior frame without renewing the address of the address generation circuit.

4. An optical disk reproducing device according to claim 3, wherein the optical disk is a CD, the synchronous signal generation circuit is a counter which receives the first synchronous signals, is reset by a logical OR of the first synchronous signals and own outputs and outputs the own outputs as the second synchronous signals, and the synchronous signal selection circuit operates the judgement circuit when the second synchronous signals are selected.

5. An optical disk reproducing device according to claim 4, wherein the counter generates a pulse having a pulse width corresponding to the side of the first half and sends out the same to the judgement circuit, and the judgement circuit receives the pulses and judges whether the detection time point of the first synchronous signal is in the first half or in the second half.

6. An optical disk reproducing device according to claim 5, further comprising a clock generation circuit, wherein the counter is a 588-adic counter which counts the clocks from the clock generation circuit, and the pulse is kept at HIGH level in substantially the half interval of the period of the second synchronous signal.

7. An optical disk reproducing device according to claim 6, wherein the judgement circuit receives the output pulses from the 588-adic counter and the first synchronous signals and judges whether the detection time point is in the first half or in the second half.

8. An optical disk reproducing device according to claim 7, further comprising an ECC error correction circuit, wherein when the judgement circuit judges that the detection time point is not in the first half, the memory and the ECC error correction circuit are operated in response to the clocks of the clock generation circuit, the data amounting one frame are successively stored in the memory and the ECC error correction circuit performs error correction of the data in the memory.

* * * * *